United States Patent [19]

Kohlhaas et al.

[11] Patent Number: 4,906,738
[45] Date of Patent: Mar. 6, 1990

[54] WATER-SOLUBLE PHENYL- OR NAPHTHYL-AZO-CARBOXYPYRAZOLONE COMPOUNDS, CONTAINING A FIBER-REACTIVE GROUP WITH A CHLORATRIAZINYL MOIETY AND A GROUP OF THE VINYLSULFONE SERIES IN THE PYRAZOLONE COUPLING COMPONENT, SUITABLE AS DYESTUFFS

[75] Inventors: Folker Kohlhaas, Hochheim am Main; Fritz Meininger, Frankfurt am Main; Hans H. Steuernagel, Kelkheim, all of Fed. Rep. of Germany

[73] Assignee: Hoechst Aktiengesellschaft, Frankfurt am Main, Fed. Rep. of Germany

[21] Appl. No.: 722,759

[22] Filed: Apr. 15, 1985

Related U.S. Application Data

[63] Continuation of Ser. No. 409,121, Aug. 18, 1982, abandoned.

[30] Foreign Application Priority Data

Aug. 20, 1981 [DE] Fed. Rep. of Germany ....... 3132917

[51] Int. Cl.$^4$ .................. C09B 62/04; C09B 62/44; C09B 62/443; D06P 1/38
[52] U.S. Cl. .................................. 534/636; 534/617; 534/642; 534/598
[58] Field of Search .................. 534/636, 617, 642

[56] References Cited

U.S. PATENT DOCUMENTS 3,223,470 12/1965 Boedeker et al. ............... 534/636 X
3,455,897  7/1969 Barben ........................... 534/636

FOREIGN PATENT DOCUMENTS 1265698 4/1968 Fed. Rep. of Germany ... 534/636 X
2034343 6/1980 United Kingdom ................ 534/636

Primary Examiner—Floyd D. Angel
Attorney, Agent, or Firm—Curtis, Morris & Safford

[57] ABSTRACT

Water-soluble monoazo compounds of the general formula (1)

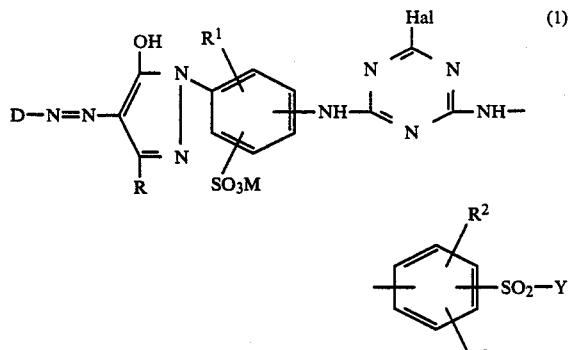

in which D is a phenyl radical or naphthyl radical, either of which is substituted and mandatorily contains at least one group which imparts solubility in water and D is substituted, for example by 1, 2 or 3 substituents which can be selected from the set consisting of 1 sulfamoyl, 1 carbamoyl, 1 trifluoromethyl, 1 benzothiazol-2-yl, 1 sulfobenzothiazol-2-yl, 1 methylbenzothiazol-2-yl, 1 methylsulfobenzothiazol-2-yl, 1 styryl, 1 nitrostyryl, 1 sulfostyryl and 1 nitrosulfostyryl group and, preferably, three sulfo groups, two carboxy groups, two alkyl groups of 1–4 C atoms, two alkoxy groups of 1–4 C atoms, 1 bromine atom and two chlorine atoms and one or two groups of the formula —$SO_2$—Z with Z of the meaning below, and the group —$SO_2$—Z can also be bonded to one of the substituents and Z represents the $\beta$-hydroxyethyl group or, preferably a group Y of the meaning indicated below, M is a hydrogen atom or an equivalent of a monovalent, divalent or trivalent metal of the main groups of the periodic system, R is the methyl group, a carboxy group or a carboalkoxy group of 2 to 5 C atoms, $R^1$ is a hydrogen atom or an alkyl group of 1 to 4 C atoms, $R^2$ is a hydrogen atom, an alkyl group of 1–4 C atoms, an alkoxy group of 1–4 C atoms or a chlorine atom, $R^3$ is a hydrogen atom, and alkyl group of 1–4 C atoms or an alkoxy group of 1–4 C atoms, Y is the vinyl group or an ethyl group which contains a radical in $\beta$-position which can be eliminated as an anion under alkaline conditions, such as, for example, a $\beta$-sulfatoethyl group, and Hal is a chlorine or fluorine atom.

The new monoazo compounds are prepared analogously to known procedures from the components (the diazo component D-$NH_2$, the pyrazolone coupling component with an aminosulfophenyl radical in the 1-position, cyanuric chloride or cyanuric fluoride, and an aniline compound containing the group —$SO_2$—Y) evident from the formula (1). They have very good fiber-reactive dyestuff properties and produce, for example, on cellulose fiber materials deep and fast dyeings and prints.

23 Claims, No Drawings

WATER-SOLUBLE PHENYL- OR NAPHTHYL-AZO-CARBOXYPYRAZOLONE COMPOUNDS, CONTAINING A FIBER-REACTIVE GROUP WITH A CHLORATRIAZINYL MOIETY AND A GROUP OF THE VINYLSULFONE SERIES IN THE PYRAZOLONE COUPLING COMPONENT, SUITABLE AS DYESTUFFS

This application is a continuation of application Ser. No. 409,121, filed Aug. 18, 1982 abandoned.

The invention relates to the industrial field of fiber-reactive azo dyestuffs.

New water-soluble monoazo compounds have been found which correspond to the general formula (1)

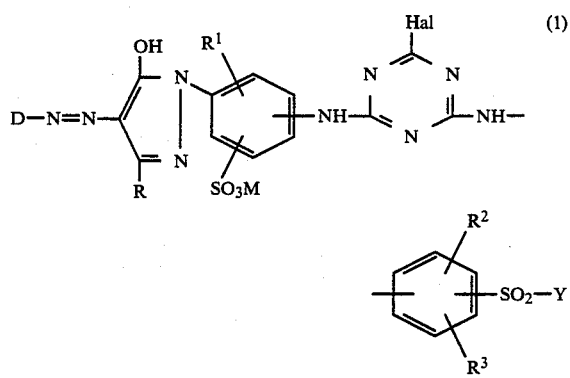

in which D is a phenyl group or naphthyl group, either of which is substituted, mandatorily by at least one group which imparts solubility in water, such as a carboxy, thiosulfato, phosphato and, in particular, sulfato and sulfo group, D being substituted, for example, by 1, 2 or 3 substituents which can be selected from the set consisting of 1 sulfamoyl, 1 carbamoyl, 1 trifluoromethyl, 1 benzothiazol-2-yl, 1 sulfobenzothiazol-2-yl, 1 methylbenzothiazol-2-yl, 1 methylsulfobenzothiazol-2-yl, 1 styryl, 1 nitrostyryl, 1 sulfostyryl and 1 nitrosulfostyryl group and, preferably, three sulfo groups, two carboxy groups, two alkyl groups of 1-4 C atoms, such as ethyl and, in particular, methyl groups, two alkoxy groups of 1-4 C atoms, such as ethoxy and, in particular, methoxy groups, 1 bromine atom and two chlorine atoms and one or two groups of the formula —$SO_2$—Z with Z of the meaning below, and the group —$SO_2$—Z can also be bonded to one of the substituents, and Z represents the β-hydroxyethyl group or, preferably, a group Y of the meaning given below, M is a hydrogen atom or an equivalent of a monovalent, divalent or trivalent metal of the main groups of the periodic system, such as, in particular, of an alkali metal or alkaline earth metal, such as, for example, of sodium, potassium and calcium, R is the methyl group, a carboxy group of the formula COOM with M of the abovementioned meaning or a carboalkoxy group of 2 to 5 C atoms, such as the carbomethoxy group and the carbethoxy group, $R^1$ is a hydrogen atom or an alkyl group of 1-4 C atoms, such as, in particular, the methyl or ethyl group, $R^2$ is a hydrogen atom, an alkyl group of 1 to 4 C atoms, such as the ethyl group, and in particular, methyl group, an alkoxy group of 1-4 C atoms, such as the ethoxy and, in particular, methoxy group, or a chlorine atom, $R^3$ is a hydrogen atom, an alkyl group of 1-4 C atoms, such as the ethyl group and, in particular, methyl group, or an alkoxy group of 1-4 C atoms, such as the ethoxy group and, in particular, the methoxy group, and the formula moieties $R^1$, $R^2$, $R^3$ and R can be identical to or different from one another, Y is the vinyl group or an ethyl group which contains a radical in the β-position which can be eliminated as an anion under alkaline conditions, and is, for example, a β-thiosulfatoethyl group (corresponding to the formula —$CH_2$—$CH_2$—S—$SO_3$M with M of the abovementioned meaning), a β-phosphatoethyl group (corresponding to the formula —$CH_2$—$CH_2$—$OPO_3M_2$ with M of the abovementioned meaning), the β-chloroethyl group or the β-acetyloxyethyl group or, preferably, a β-sulfatoethyl group (corresponding to the formula —$CH_2$—$CH_2$—$OSO_3$M with M of the abovementioned meaning), and Hal is a chlorine or fluorine atom.

The new azo compounds can be in the form of acids and be in the form of their salts. They are preferably in the form of the salts, in particular the alkali metal and alkaline earth metal salts, and are also preferably used in the form of these salts for dyeing (understood here, and below, in the general sense and including printing) of materials containing hydroxy and/or carbonamide groups, in particular fiber materials.

Among compounds according to the invention those are preferable in which the formula radical Y represents the β-sulfatoethyl group. Furthermore, those compounds according to the invention can be emphasized as preferable in which D denotes the phenyl group or the naphthyl group, either of which is substituted in the ortho-position relative to the azo group by a sulfo group and can be further substituted by one or two further sulfo groups. Among these compounds in particular those are preferable in which D represents the 2-sulfophenyl group.

In addition to these azo compounds according to the invention, which, in the diazo component, are substituted merely by sulfo, also those can be mentioned in particular in which D denotes the phenyl radical which is substituted by one or two sulfo groups and/or a carboxy group and which, furthermore, can be further substituted by one or two substituents from the group consisting of chlorine, bromine, alkyl of 1-4 C atoms and alkoxy of 1-4 C atoms. Among azo compounds according to the invention those are likewise to be mentioned as particularly interesting in which the formula radical D also has, as a substituent, a group of the formula —$SO_2$—Z with Z of the abovementioned meaning.

Of monoazo compounds according to the invention those individual compounds are of particular interest which are described in Examples 1 (and 3), 4, 7 and 82.

The present invention also relates to processes for preparing the abovementioned and defined azo compounds of the general formula (1). These processes comprise coupling a diazonium compound of an amine of the general formula (3)

$$D-NH_2 \qquad (3)$$

in which D has the abovementioned meaning, with a pyrazolone compound of the general formula (4)

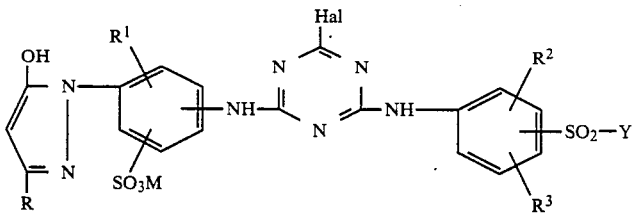
(4)

in which Hal, R, R¹, R², R³, M and Y have the abovementioned meanings, or reacting an aminoazo compound of the general formula (5)

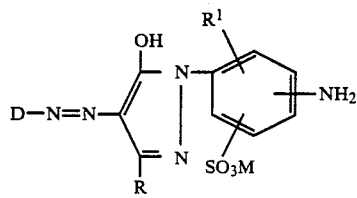
(5)

in which D, R, R¹ and M have the abovementioned meanings, with a dihalogenotriazone compound of the general formula (6)

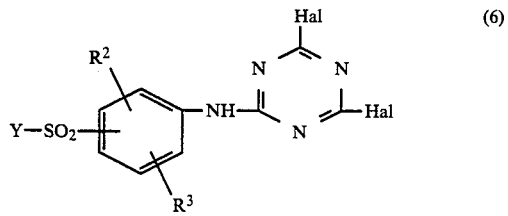
(6)

in which Hal, R², R³ and Y have the abovementioned meanings, or reacting a dihalogenotriazine-azo compound of the general formula (7)

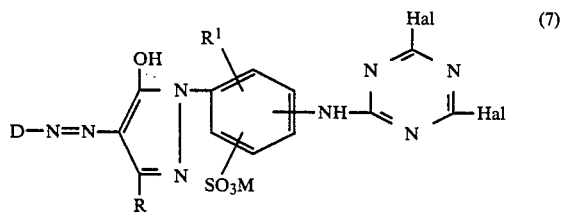
(7)

in which Hal, D, R, R¹ and M have the abovementioned meanings, with an amino compound of the general formula (8)

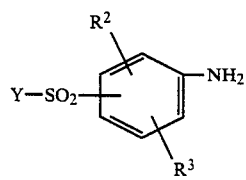
(8)

in which R², R³ and Y have the abovementioned meanings, and choosing in each case the reaction components in such a way that the resulting azo compound corresponding to the general formula (1) contains at least one group of the formula —SO₂—Y.

In starting compounds of the formulae (3), (4), (5), (6), (7) and (8), the formula radical Y (which can be present in D through the formula radical Z) can also denote the β-hydroxyethyl group. Compounds which can be prepared in this way correspond to the general formula (1) in which in this case Y or Z, or both, denote the β-hydroxyethyl group, and can be converted by means of a corresponding esterifying or acylating agent analogously to known procedures into the corresponding compounds according to the invention and of the formula (1) in which Y or Z represents an ethyl group which is substituted in the β-position by an ester group. This esterification is preferably a sulfatization, i.e. the conversion of the β-hydroxyethyl group into the β-sulfatoethyl group analogously to numerous procedures described in the literature, the preferable sulfatizing agent used being concentrated sulfuric acid or sulfuric acid containing sulfur trioxide. This esterification, preferably sulfatization, is mandatory in the particular case where Y, in starting compounds of the formulae (4), (6) and (8), represents the β-hydroxyethyl group.

Coupling components of the general formula (4), serving as starting compounds, can be prepared analogously to known procedures, for example by reacting an amino compound of the general formula (9)

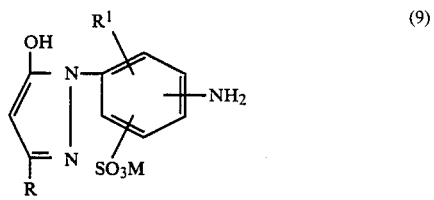
(9)

with R, R¹ and M of the abovementioned meaning with a dichlorotriazine compound of the general formula (6) indicated and defined above, or by reacting first with cyanuric chloride (2,4,6-trichloro-1,3,5-triazine) or cyanuric fluoride (2,4,6-trifluoro-1,3,5-triazine) to give a compound of the general formula (10)

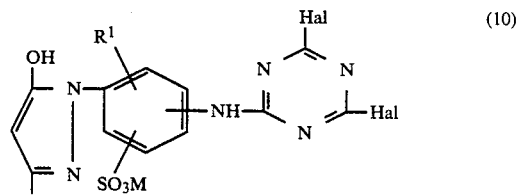
(10)

with R, R¹, M and Hal of the abovementioned meaning, and then reacting this compound with an amine of the general formula (8) indicated and defined above.

Aminoazo compounds of the general formula (5), serving as starting compounds, can be prepared likewise analogously to known procedures, by, for example, diazotizing a compound of the above-defined general formula (3) and coupling the resulting diazonium compound with a pyrazolone compound of the abovementioned and defined general formula (9).

Dihalogenotriazone compounds, corresponding to the general formula (6) and serving as starting compounds can also be prepared analogously to known procedures, for example by reacting cyanuric chloride or cyanuric fluoride with an amine of the general formula $H_2N$—D—$SO_2$—Y with D and Y of the abovementioned meaning. The dihalogenotriazine compound of the general formula (7) can be synthesized analogously to known procedures by condensing cyanuric chloride or cyanuric fluoride with an aminoazo compound of the general formula (5) indicated and defined above or by reacting a diazonium compound of an amine of the general formula (3) indicated and defined above with a pyrazolone compound of the general formula (10) indicated and defined above.

The reaction of cyanuric chloride or cyanuric fluoride with an aminoazo compound of the general formula (5) to give a compound of the general formula (7) and also the reaction of cyanuric chloride or cyanuric fluoride with an amino compound of the general formula (8) to give a compound of the general formula (6) can be carried out in an organic or aqueous-organic medium. The reaction is preferably carried out in an aqueous medium with the addition of acid-binding agents, such as alkali metal or alkaline earth metal carbonates, alkali metal or alkaline earth metal hydrogen carbonates or hydroxides or alkali metal acetates, the preferable alkali and alkaline earth metals being sodium, potassium and calcium; acid-binding agents are also tertiary amines, such as, for example, pyridine or triethylamine or quinoline. The addition of small amounts of a commercially available wetting agent can also be advantageous. These condensation reactions are carried out at a temperature between $-10°$ C. and $+40°$ C., preferably between $-10°$ C. and $+30°$ C., particularly preferably at a temperature between $0°$ C. and $+10°$ C., and at a pH value between 1.0 and 7.0, in particular between 3.0 and 6.0.

The reaction according to the invention of dihalogenotriazinylamino compounds of the general formulae (6), (7) and (10) with corresponding amino compounds of the general formulae (5), (8) or (9), to give compounds of the general formula (1) or intermediate compounds of the general formula (4), can also be carried out in an organic or aqueous-organic medium. However, these reactions are preferably carried out in an aqueous medium, an acid-binding agent, such as one of those mentioned above, being added if necessary. The addition of small amounts of a commercially available wetting agent can also be advantageous. The reaction of the amino groups with the chlorine or fluorine of the triazine compounds in the processes according to the invention is preferably carried out at a temperature between $0°$ and $60°$ C., particularly preferably between $10°$ and $50°$ C., and at a pH value between 2 and 9, in particular between 3 and 8.

Amino compounds of the general formula (3) are diazotized analogously to known procedures, for example in an aqueous-organic and primarily in an aqueous, acidic medium, by nitrous acid. The diazonium compounds are reacted with pyrazolone compounds of the general formula (4) and (9) or (10) also analogously to known procedures, for example in aqueous-organic, but predominantly in an aqueous medium, in a weakly acid to neutral, or alternatively very weakly alkaline, pH range.

Examples of amino compounds of the general formula (3), which can serve as diazo components in the preparation of compounds according to the invention, are 1-aminobenzene-2-sulfonic acid, 1-aminobenzene-3-sulfonic acid, 1-aminobenzene-4-sulfonic acid, 2-amino-4-sulfobenzoic acid, 2-amino-5-sulfobenzoic acid, 4-amino-2-sulfobenzoic acid, 4-aminotoluene-2-sulfonic acid, 4-aminotoluene-3-sulfonic acid, 2-aminotoluene-4-sulfonic acid, 2-aminotoluene-5-sulfonic acid, 2-aminotoluene-4-carboxylic acid, anthranilic acid, 4-aminobenzoic acid, 2-aminoanisole-4-sulfonic acid, 2-aminoanisole-5-sulfonic acid, 4-aminoanisole-2-sulfonic acid, 4-aminoanisole-3-sulfonic acid, 3-chloro-2-aminotoluene-5-sulfonic acid, 4-chloro-2-aminotoluene-5-sulfonic acid, 5-chloro-2-aminotoluene-3-sulfonic acid, 5-chloro-2-aminotoluene-4-sulfonic acid, 6-chloro-2-aminotoluene-4-sulfonic acid, 6-chloro-3-aminotoluene-4-sulfonic acid, 2,5-disulfoaniline, 2,4-disulfoaniline, 3,5-disulfoaniline, 2-aminotoluene-3,5-disulfonic acid, 2-aminotoluene-4,5-disulfonic acid, 2-aminotoluene-4,6-disulfonic acid, 4-aminotoluene-2,5-disulfonic acid, 2-(3'-sulfo-4'-aminophenyl)-6-methylbenzothiazole-7-sulfonic acid, 4-nitro-4'-aminostilbene-2,2'-disulfonic acid, 2-aminonaphthalene-1-sulfonic acid, 2-aminonaphthalene-5-sulfonic acid, 2-aminonaphthalene-6-sulfonic acid, 2-aminonaphthalene-7-sulfonic acid, 2-aminonaphthalene-8-sulfonic acid, 1-aminonaphthalene-2-sulfonic acid, 1-aminonaphthalene-3-sulphonic acid, 1-aminonaphthalene-4-sulfonic acid, 1-aminonaphthalene-5-sulfonic acid, 1-aminonaphthalene-6-sulfonic acid, 1-aminonaphthalene-7-sulfonic acid, 1-aminonaphthalene-8-sulfonic acid, 2-aminonaphthalene-4,8-disulfonic acid, 2-aminonaphthalene-6,8-disulfonic acid, 2-aminonaphthalene-1,5-disulfonic acid, 2-aminonaphthalene-1,7-disulfonic acid, 2-aminonaphthalene-5,7-disulfonic acid, 2-aminonaphthalene-3,6-disulfonic acid, 2-aminonaphthalene-3,7-disulfonic acid, 2-aminonaphthalene-4,7-disulfonic acid, 1-aminonaphthalene-2,4-disulfonic acid, 1-aminonaphthalene-2,5-disulfonic acid, 1-aminonaphthalene-3,6-disulfonic acid, 1-aminonaphthalene-3,7-disulfonic acid, 1-aminonaphthalene-3,8-disulfonic acid, 1-aminonaphthalene-4,6-disulfonic acid, 1-aminonaphthalene-4,7-disulfonic acid, 1-aminonapthalene-4,8-disulfonic acid, 1-aminonaphthalene-5,7-disulfonic acid, 1-aminonaphthalene-6,8-disulfonic acid, 2-aminonaphthalene-3,6,8-trisulfonic acid, 2-aminonaphthalene-4,6,8-trisulfonic acid, 2-aminonaphthalene-1,5,7-trisulfonic acid, 1-aminonaphthalene-2,4,7-trisulfonic acid, 1-aminonaphthalene-1,5,7-trisulfonic acid, 1-aminonaphthalene-2,4,7-trisulfonic acid, 1-aminonaphthalene-2,4,8-trisulfonic acid, 1-aminonaphthalene-3,5,7-trisulfonic acid, 1-aminonaphthalene-3,6,8-trisulfonic acid, 1-aminonaphthalene-4,6,8-trisulfonic acid, 1-amino-3-($\beta$-sulfatoethylsulfonyl)-benzene, 1-amino-2-methoxy-5-($\beta$-sulfatoethylsulfonyl)-benzene, 1-amino-2-methoxy-4-($\beta$-sulfatoethylsulfonyl)-benzene, 1-amino-2-methyl-5-($\beta$-sulfatoethylsulfonyl)-benzene, 1-amino-2-methyl-4-($\beta$-sulfatoethylsulfonyl)-benzene, 1-amino-4-methoxy-5-($\beta$-sulfatoethylsulfonyl)-benzene, 1-amino-4-methyl-5-($\beta$-sulfatoethylsulfonyl)-benzene, 1-amino-2-methoxy-5-methyl-4-($\beta$-sulfatoethylsulfonyl)-benzene, 1-amino-2,5-dimethoxy-4-($\beta$-sulfatoethylsulfonyl)-benzene, 1-amino-2,4-dimethoxy-5-($\beta$-sulfatoethylsulfonyl)-benzene, 1-amino-2-methyl-5-methoxy-4-($\beta$-sulfatoethylsulfonyl)-benzene, 2-chloro-1-amino-5-($\beta$-sulfatoethylsulfonyl)-benzene, 4-chloro-1-amino-2-methyl-3-(β-sulfatoethylsulfonyl)-benzene, 5-chloro-1-amino-2-methoxy-4-(β-sulfatoethylsulfonyl)-benzene and 1-amino-4-(β-sulfatoethylsulfonyl)-benzene-2-sulfonic acid and the corresponding β-thiosulfatoethylsulfonyl, β-phosphatoethylsulfonyl, β-chloroethylsulfonyl, β-acetoxyethylsulfonyl and vinylsulfonyl compounds and, if appropriate, β-hydroxyethylsulfonyl compounds of these β-sulfatoethylsulfonyl compounds, furthermore, preferably, 1-amino-4-(β-sulfatoethylsulfonyl)-benzene and its corresponding thiosulfatoethyl, phosphatoethyl, chloroethyl, acetoxyethyl and vinyl derivatives and, if appropriate, β-hydroxyethyl derivatives.

Examples of amino compounds of the general formula (8) which serve as starting compounds for preparing the compounds according to the invention, are 1-amino-3-(β-sulfatoethylsulfonyl)-benzene, 1-amino-2-methoxy-5-(β-sulfatoethylsulfonyl)-benzene, 1-amino-2-methoxy-4-(β-sulfatoethylsulfonyl)-benzene, 1-amino-2-methyl-5-(β-sulfatoethylsulfonyl)-benzene, 1-amino-2-methyl-4-(β-sulfatoethylsulfonyl)-benzene, 1-amino-4-methoxy-5-(β-sulfatoethylsulfonyl)-benzene, 1-amino-4-methyl-5-(β-sulfatoethylsulfonyl)-benzene, 1-amino-2-methoxy-5-methyl-4-(β-sulfatoethylsulfonyl)-benzene, 1-amino-2,5-dimethoxy-4-(β-sulfatoethylsulfonyl)-benzene, 1-amino-2,4-dimethoxy-5-(β-sulfatoethylsulfonyl)-benzene, 1-amino-2-methyl-5-methoxy-4-(β-sulfatoethylsulfonyl)-benzene, 2-chloro-1-amino-5-(β-sulfatoethylsulfonyl)-benzene, 4-chloro-1-amino-2-methyl-3-(β-sulfatoethylsulfonyl)-benzene, 5-chloro-1-amino-2-methoxy-4-(β-sulfatoethylsulfonyl)-benzene and the corresponding β-thiosulfatoethylsulfonyl, β-phosphatoethylsulfonyl, β-chloroethylsulfonyl, β-acetoxyethylsulfonyl and vinylsulfonyl compounds and, if appropriate, β-hydroxyethylsulfonyl compounds of these β-sulfatoethylsulfonyl compounds, and further, preferably, 1-amino-4-(β-sulfatoethylsulfonyl)-benzene and its corresponding thiosulfatoethyl, phosphatoethyl, chloroethyl, acetoxyethyl and vinyl derivatives and, if appropriate, β-hydroxyethyl derivatives.

Examples of pyrazolone compounds corresponding to the general formula (9) and serving as starting compounds in the preparation of azo compounds according to the invention are 1-(3-amino-6-sulfophenyl)-3-methyl-5-pyrazolone, 1-(4-amino-3-sulfophenyl)-3-methyl-5-pyrazolone, 1-(4-amino-2-sulfophenyl)-3-methyl-5-pyrazolone, 1-(3-amino-6-sulfophenyl)-5-pyrazolone-3-carboxylic acid, 1-(4-amino-3-sulfophenyl)-5-pyrazolone-3-carboxylic acid, 1-(3-amino-5-sulfo-6-methylphenyl)-5-pyrazolone-3-carboxylic acid, 1-(2-methyl-3-amino-5-sulfophenyl)-5-pyrazolone-3-carboxylic acid, 1-(2-methyl-3-amino-5-sulfophenyl)-3-methyl-5-pyrazolone, 1-(3-amino-5-sulfo-6-methylphenyl)-3-methyl-5-pyrazolone and 1-(4-methyl-2,5-disulfophenyl)-5-pyrazolone-3-carboxylic acid.

Compounds prepared according to the invention and of the general formula (1) can be precipitated and isolated from the synthesis solutions by generally known methods, for example either by precipitation from the reaction medium by means of electrolytes, such as, for example, sodium chloride or potassium chloride, or by evaporating the reaction solution, for example spray drying, in which case a buffer substance can be added to this reaction solution.

Compounds according to the invention, of the general formula (1), have fiber-reactive properties and very good dyestuff properties. They can therefore be used for dyeing (including printing) materials containing hydroxy groups and/or carbonamide groups. The solutions obtained in the synthesis of compounds according to the invention can also be used for dyeing directly as a liquid composition, if appropriate after addition of a buffer substance and, if appropriate, also after concentrating.

The present invention therefore also relates to the use of compounds according to the invention, of the general formula (1), for dyeing (including printing) materials containing hydroxy and/or carbonamide groups and to processes for their application to these substrates. The materials are preferably used in the form of fiber materials, in particular in the form of textile fibers, such as yarns, wound packages and fabrics. In these processes, known procedures can be followed, by applying or introducing the monoazo compound of the general formula (1) in a dissolved form to or into the substrate and fixing it on or in this substrate, if appropriate by the action of heat and/or if appropriate by the action of an agent having an alkaline action.

Materials containing hydroxy groups are those of natural or synthetic origin, such as, for example, cellulose fiber materials or their regenerated products and polyvinyl alcohols. Cellulose fiber materials are preferably cotton, but also other vegetable fibers, such as linen, hemp, jute and ramie fibers; examples of regenerated cellulose fibers are viscose staple and filament viscose.

Examples of materials containing carbonamide groups are synthetic and natural polyamides and polyurethanes, in particular in the form of fibers, for example wool and other animal hairs, silk, leather, polyamide-6,6, polyamide-6, polyamide-11 and polyamide-4.

Compounds according to the invention, of the general formula (1), can be applied to and fixed on the substrates mentioned, in particular on the fiber materials mentioned, by the application techniques known for water-soluble, in particular water-soluble fiber reactive dyestuffs. Such dyeing and fixing methods have been numerously described in the literature.

These dyestuffs thus produce on cellulose fibers by the exhaust methods from a long liquor with the use of a very wide variety of acid-binding agents and, if appropriate, neutral salts, such as sodium chloride or sodium sulfate, very good color yields and an excellent color build-up. Dyeing is preferably carried out in an aqueous bath at temperatures between 60° and 105° C., optionally at a temperature up to 120° C. under pressure and, if appropriate, in the presence of customary dyeing auxiliaries. One possible way of carrying out this dyeing is to introduce the material into the warm bath, gradually warming the latter to the dyeing temperature desired, and completing the dyeing process at this temperature. Neutral salts accelerating the exhaustion of the dyestuff can be added to the bath, if desired even only after the actual dyeing temperature has been reached.

The padding process also produces excellent color yields and a very good color build-up on cellulose fibers, and fixing can be carried out in a customary manner by leaving the dyeing to stand at room temperature or at an elevated temperature, for example up to about 60° C., by steaming or by means of dry heat.

Deep prints having well-delineated contours and a clear white ground are also obtained by the customary printing processes for cellulose fibers, which can be carried out in a one-step operation, for example by printing with a print paste containing sodium bicarbonate or another acid-binding agent and by subsequent steaming at 100° to 103° C., or in a two-step operation, for example by printing with a neutral or weakly acidic print paste and subsequent fixing either by passing through a hot electrolyte-containing alkaline bath or by overpadding with an alkaline electrolyte-containing padding liquor and subsequent leaving to stand of this overpadded material or steaming or treatment with dry heat. The outcome of the prints depends only to a small extent on varying fixing conditions. In the fixing by means of dry heat in the customary thermofixing processes, hot air of 120° to 200° C. is used. Instead of customary steam of 101° to 103° C. superheated steam and saturated steam of temperatures up to 160° C. can also be used.

Examples of agents which bind acid and effect the fixing of the compound of the formula (1) on cellulose fibers are water-soluble basic salts of alkali metals and also alkaline earth metals of inorganic and organic acids or compounds which liberate alkali when subjected to heat. Particular mention must be made of alkali metal hydroxides and alkali metal salts of weak to medium strong inorganic or organic acids, sodium and potassium compounds being preferably intended among the alkali metal compounds. Examples of such acid-binding agents are sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass and trisodium phosphate.

The treatment of compounds according to the invention with acid-binding agents, if appropriate under the influence of heat, bonds the compounds according to the invention (dyestuffs) chemically to the cellulose fiber: in particular cellulose dyeings have, after the customary after-treatment by rinsing to remove unfixed dyestuff portions, excellent wet fastness properties; for unfixed portions of dyestuff can be readily washed out owing to their good solubility in cold water.

Polyurethane fibers or natural or synthetic polyamide fibers are customarily dyed from an acidic medium. Thus, for example, acetic acid and/or ammonium sulfate and/or acetic acid and ammonium acetate or sodium acetate can be added to the dye bath to obtain the pH value desired. To obtain acceptable levelness of the dyeing it is advisable to add customary leveling auxiliaries, such as, for example, those based on a reaction product of cyanuric chloride with the 3-fold molar amount of an aminobenzenesulfonic acid and/or an aminonaphthalenesulfonic acid and/or those based on a reaction product of, for example, stearylamine with ethylene oxide. As a rule, the material to be dyed is introduced at a temperature of about 40° C. into the bath, agitated therein for some time, the dye bath is then adjusted to the weakly acid, preferably weakly acetic acid, pH value desired, and the actual dyeing is carried out at a temperature between 60° and 98° C. However, the dyeings can also be carried out at the boil or at temperatures up to 120° C. (under pressure).

Dyeings and prints prepared by means of compounds according to the invention, of the general formula (1), have greenish yellow to yellow shades and are as a rule distinguished by high tinctorial strength and a clear hue. In particular, dyeings and prints on cellulose fiber materials have a very good light fastness and good to very good wet fastness properties, such as, for example, good to very good fastness to washing, chlorinated water, fulling, water, seawater, cross-dyeing and perspiration, and also a good fastness to pleating, ironing and rubbing.

The use according to the invention of compounds of the general formula (1) is likewise also of importance for the fiber-reactive dyeing of wool. In particular, even wool which has been finished to be non-felting or low-felting (cf., for example, H. Rath, Lehrbuch der Textilchemie [Textbook of Textile Chemistry], published by Springer, 3rd Edition (1972), pages 295–299, in particular the finish by the socalled Hercosett method (page 298); J. Soc. Dyers and Colourists 1972, 93–99, and 1975, 33–44) can be dyed with very good fastness properties.

This process of dyeing wool is carried out in a customary and known dyeing method by subjecting the fiber-reactive compound of the general formula (1), preferably initially from an acidic dye bath having a pH of about 3.5 to 5.5 under control of the pH value, to the exhaust process and, toward the end of the dyeing time, shifting the pH value into the neutral and, if appropriate, weakly alkaline range up to a pH value of 8.5, to bring about the full reactive bond between this dyestuff of the formula (1) and the fiber (in particular when it is desired to obtain high depths of shade). The portion of the dyestuff which is not bonded reactively is dissolved away at the same time.

The procedure described here is also applicable for preparing dyeings on fiber materials made of other natural polyamides or made of synthetic polyamides and polyurethanes. The dyeings are carried out at temperatures of 60° to 100° C., but they can also be carried out in closed dyeing machines at temperatures up to 106° C. Since compounds of the general formula (1) are very readily soluble in water, the compounds can advantageously also be used in customary continuous dyeing processes. The tinctorial strength of compounds according to the invention, of the general formula (1), is very high. They produce on fiber materials, in particular on reactively dyeing wool, clear, greenish yellow to yellow dyeings. A high bath exhaustion is found on using dyeing temperatures of 100° to 106° C.

In the case of dyeings obtainable by means of compounds according to the invention, of the general formula (1), an otherwise customary ammoniacal after-treatment of the dyed goods can be dispensed with. Compared to structurally similar, known dyestuffs, the compounds, surprisingly, have a very good color build-up which retains the brilliant hue even in deep shades. The compounds moreover are readily compatible with other fiber-reactive wool dyestuffs which make possible a surprisingly level dyeing of the fiber. Material made of wool fibers of differing provenience can also be dyed level with compounds according to the invention. To improve the leveling behavior, a customary leveling auxiliary, such as, for example, N-methyltaurine, can be added if necessary.

Compounds according to the invention used together with customary dyeing auxiliaries which have affinity for the fiber produce level dyeings even on wool finished to be non-felting or low-felting. In the case of pale to medium depths of shade, a very good wet fastness level can be obtained even without ammoniacal after-treatment, but an ammoniacal after-treatment may be preferable. In addition to the high light fastness of these wool dyeings, the excellent alkaline perspiration fastness and very good fastness to washing at 60° C., even of dyeings in high depths of shade, must be mentioned in particular as very good wet fastness properties.

The examples which follow serve to illustrate the invention. The parts are parts by weight and the percentage data are percentages by weight unless otherwise stated. Parts by weight relate to parts by volume as the kilogram relates to the liter. Compounds described by formulae in the examples are shown in the form of free acids; in general they are prepared and isolated in the form of their salts, such as, sodium or potassium salts, and used for dyeing in the form of their salts. Starting compounds mentioned in the examples which follow, in particular the tabled examples, in the form of the free acid can also be used as such or in the form of their salts, preferably alkali metal salts, such as sodium or potassium salts, in the synthesis.

EXAMPLE 1

(a) An aqueous solution, having a pH value of 6 to 7, of 57 parts of 1-amino-4-(β-sulfatoethylsulfonyl)-benzene in 300 parts of water is allowed to flow into a suspension of 38.6 parts of cyanuric chloride and 1 part of a commercially available wetting agent in 50 parts of water and 200 parts of ice. A pH value between 2 and 4 is maintained by means of sodium bicarbonate during the acylation reaction, while the mixture is vigorously stirred at a temperature between 0° and 10° C. The degree of conversion is over 99%.

(b) 1,000 parts by volume of an aqueous neutral solution of 97 parts of the aminoazo compound of the formula

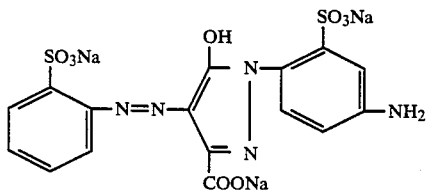

(prepared by coupling diazotized aminobenzene-2-sulfonic acid onto 1-(4-amino-2-sulfophenyl)-5-pyrazolone-3-carboxylic acid) are added to the suspension prepared according to (a). The reaction temperature is raised in the course of 2 hours to 40° to 45° C., and the reaction mixture is stirred for about 3 hours at a temperature between 40° and 45° C. until the acylation reaction is complete; a pH value between 5 and 5.5 is maintained by means of sodium bicarbonate.

The resulting azo compound according to the invention is isolated in a customary manner, for example by evaporating the neutral solution or by spray drying or by salting out with an electrolyte salt, such as, for example, sodium chloride or potassium chloride. A yellow powder which contains an alkali metal salt, such as the sodium salt and/or potassium salt, of the compound of the formula

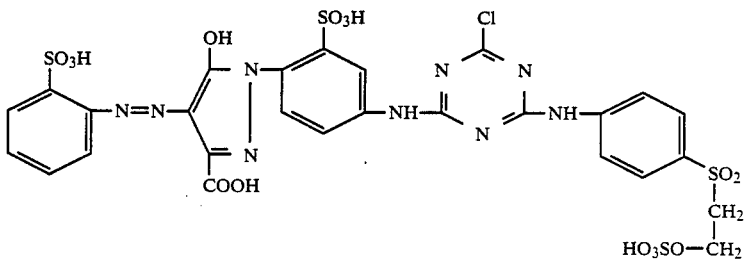

is obtained. This azo compound according to the invention has very good dyestuff properties and produces on materials mentioned in the descriptive section, such as, in particular, on cellulose fiber materials, for example cotton, by application and fixing methods customary in industry, in particular for fiber-reactive dyestuffs, deep, greenish yellow dyeings and prints of good light fastness property and of good wet fastness properties, such as, in particular, good fastness values to washing, fulling, cross-dyeing, chlorinated water and perspiration.

EXAMPLE 2

A suspension of 57 parts of 4-(β-sulfatoethylsulfonyl)-aniline in 300 parts of water is adjusted to pH 4.0 and cooled, by means of ice, down to a temperature between −2° C. and 0° C. 32 parts of 2,4,6-trifluoro-1,3,5-triazine (cyanuric fluoride) are then added with vigorous stirring and, at the same time, a pH value of 3.5 is maintained by means of an aqueous sodium bicarbonate solution. After some minutes amine is no longer detectable, and the suspension is then reacted with the trisodium salt of the aminoazo compound indicated in Example 1(b) in the manner described in Example 1(b), but, in this case, at a temperature between 10° and 20° C. On isolation of the product, a yellow powder is obtained which, in addition to electrolyte salts, contains an alkali metal salt, such as the sodium salt or/and potassium salt, of the compound of the formula

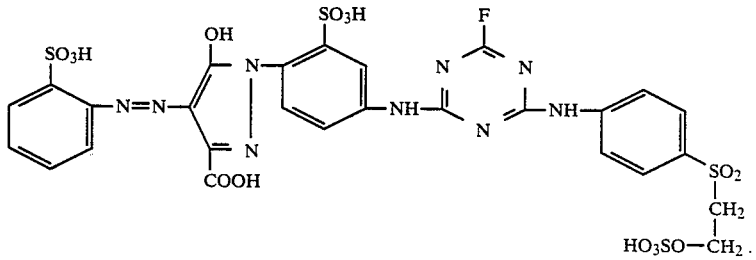

This azo compound according to the invention has very good fiber-reactive dyestuff properties and dyes, for example, cellulose fiber materials in deep, greenish yellow shades by the application and fixing methods customary in industry. The dyeings and prints obtained have very good light fastness and wet fastness properties, such as, for example, good fastness properties to washing, fulling, perspiration, cross-dyeing and chlorinated water.

is obtained which contains an alkali metal salt of the compound of the formula

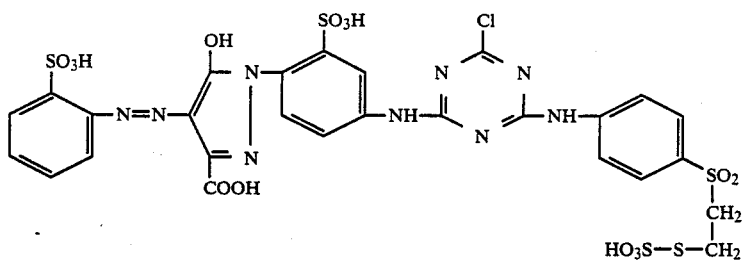

EXAMPLE 3

(a) 1,000 parts by volume of a cooled aqueous, neutral solution below 10° C. of 97 parts of the aminoazo starting compound used in Example 1(b) are allowed to flow into a suspension of 38.6 parts of cyanuric chloride in 50 parts of water and 200 parts of ice. This reaction mixture is vigorously stirred for about 4 hours at a temperature between 0° and 10° C., the pH value being maintained at 3.5 to 4.5 by means of sodium bicarbonate, until the acylation reaction is complete.

(b) 400 parts by volume of an aqueous, neutral solution of 59 parts of 4-(β-sulfatoethylsulfonyl)-aniline are slowly added with stirring to the batch prepared under (a). The reaction temperature is then increased in the course of 2 hours to 40° to 45° C., and the reaction mixture is further stirred at 40° to 50° C. for about a further 12 hours, during which period a pH value between 4.5 and 6.5 is maintained by means of sodium carbonate.

The resulting azo compound according to the invention is isolated in a customary manner. It is identical to the azo compound according to the invention prepared in accordance with Example 1 and has the same good dyeing properties and good fastness properties as this azo compound of Example 1.

EXAMPLE 4

An azo compound according to the invention is synthesized in accordance with the process instructions of Example 1, but, in Example 1(a), 4-(β-sulfatoethylsulfonyl)-aniline is replaced by 60 parts of 4-(β-thiosulfatoethylsulfonyl)-aniline.

After the synthesis solution has been worked up and the product isolated, an electrolyte-containing powder which has very good dyestuff properties and produces, for example, on cotton, by the application and fixing methods customary in industry, in particular those for fiber-reactive dyestuffs, deep, greenish yellow dyeings and prints of good light and wet fastness properties, such as good fastness properties to washing, fulling and crossdyeing as well as good perspiration fastness properties.

EXAMPLE 5

To prepare an azo compound according to the invention, the instructions of Example 3 are followed, but the aqueous solution of 4-(β-sulfatoethylsulfonyl)-aniline used there in Example 3(b) is replaced by a solution of 39 parts of 4-vinylsulfonylaniline in 200 parts by volume of acetone.

After the customary working-up of the synthesis solution and isolation of the product, an electrolyte-containing powder is obtained which contains an alkali metal salt, such as, for example, the sodium salt of the compound of the formula

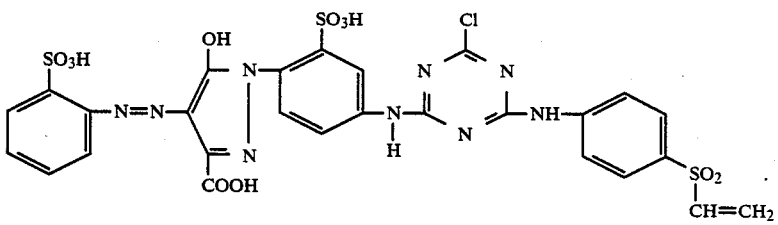

This compound has very good fiber-reactive dyestuff properties and produces by the application and fixing methods customary in industry, for example, on cotton, deep, greenish yellow dyeings and prints of good light and wet fastness properties; the quality of the dyeings obtainable with this azo compound according to the invention is comparable to that possessed by dyeings obtainable with the azo compound according to the invention of Example 1.

EXAMPLE 6

The procedure of Example 3 is followed, but the aqueous solution of 4-(β-sulfatoethylsulfonyl)-aniline in process step (b) is replaced there by 46 parts of powdered 4-(β-chloroethylsulfonyl)-aniline.

After the synthesis solution has been worked up and the product isolated, an electrolyte-containing powder is obtained which contains an alkali metal salt of the compound of the formula

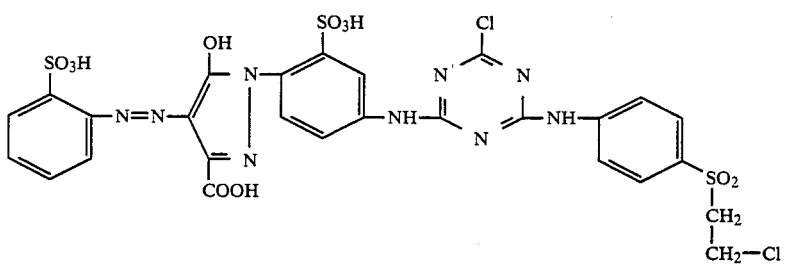

which has very good dyestuff properties and dyes, for example, cotton, by the application and fixing methods customary in industry for fiber-reactive dyestuffs, in deep, greenish yellow shades of good light and wet fastness properties.

EXAMPLE 7

To prepare an azo compound according to the invention, the procedures of Example 1 or the procedures of Example 3 are followed, but with the modification that the aminoazo compound used there as starting compound is replaced by 99 parts of the aminoazo compound of the formula

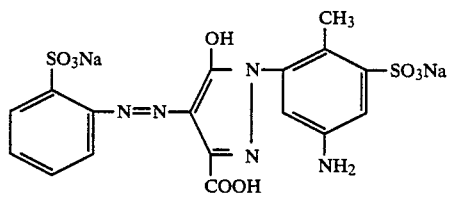

After the synthesis solution has been worked up and the product isolated, an electrolyte-containing power is obtained which contains alkali metal salt, such as the sodium salt or/and potassium salt, of the compound of the formula

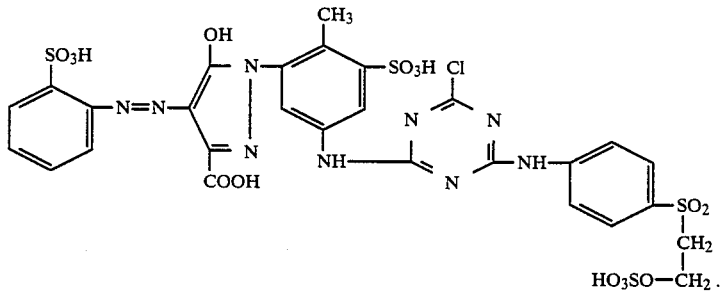

This azo compound according to the invention has very good fiber-reactive dyestuff properties and produces, for example, on cotton, by the application and fixing methods customary in industry for fiber-reactive dyestuffs, deep, greenish yellow dyeings and prints of very good light and wet fastness properties.

EXAMPLES 8 tO 72

The tabled examples below describe further monoazo compounds according to the invention and corresponding to the general formula (1) by means of their components from which they are built up together with the radical of cyanuric chloride or cyanuric fluoride. They can be prepared from these amino compounds and cyanuric chloride or cyanuric fluoride and the coupling components in a manner according to the invention, such as, for example, according to one of the process variants described in Examples 1 to 8 above. They have very good fiber-reactive dyestuff properties and produce on the materials mentioned in the descriptive section, such as, in particular, cellulose fiber materials, for example cotton, deep dyeings and prints having good fastness properties and the hue of the cotton dyeing indicated in the particular tabled example.

In these tabled examples, the formula moieties $Z_1$ to $Z_6$ have the following meanings:

$Z_1$: $-SO_2-CH_2-CH_2-OSO_3M$
$Z_2$: $-SO_2-CH_2-CH_2-S-SO_3M$
$Z_3$: $-SO_2-CH_2-CH_2-Cl$
$Z_4$: $-SO_2-CH=CH_2$
$Z_5$: $-SO_2-CH_2-CH_2-OCO-CH_3$
$Z_6$: $-SO_2-CH_2-CH_2-OPO_3M_2$, in which M has the meaning mentioned in the descriptive section.

| Example | Amine of the general formula (8) | Amine of the general formula (3) | Coupling component of the general formula (9) | Hue |
|---|---|---|---|---|
| 8 | H₂N—⬡—Z₅ | aminobenzene-2-sulfonic acid | 1-(3-amino-5-sulfo-6-methylphenyl)-5-pyrazolone-3-carboxylic acid | greenish yellow |

-continued

| Example | Amine of the general formula (8) | Amine of the general formula (3) | Coupling component of the general formula (9) | Hue |
|---|---|---|---|---|
| 9 | 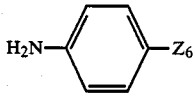 H$_2$N—⌬—Z$_6$ | aminobenzene-2-sulfonic acid | 1-(3-amino-5-sulfo-6-methylphenyl)-5-pyrazolone-3-carboxylic acid | greenish yellow |
| 10 | 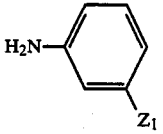 H$_2$N—⌬—Z$_1$ | aminobenzene-2-sulfonic acid | 1-(3-amino-5-sulfo-6-methylphenyl)-5-pyrazolone-3-carboxylic acid | greenish yellow |
| 11 | 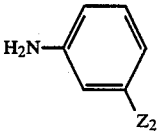 H$_2$N—⌬—Z$_2$ | aminobenzene-2-sulfonic acid | 1-(3-amino-5-sulfo-6-methylphenyl)-5-pyrazolone-3-carboxylic acid | greenish yellow |
| 12 | 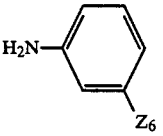 H$_2$N—⌬—Z$_6$ | aminobenzene-2-sulfonic acid | 1-(3-amino-5-sulfo-6-methylphenyl)-5-pyrazolone-3-carboxylic acid | greenish yellow |
| 13 | 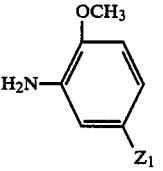 OCH$_3$, H$_2$N—⌬—Z$_1$ | aminobenzene-2-sulfonic acid | 1-(3-amino-5-sulfo-6-methylphenyl)-5-pyrazolone-3-carboxylic acid | greenish yellow |
| 14 | 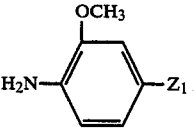 OCH$_3$, H$_2$N—⌬—Z$_1$ | aminobenzene-2-sulfonic acid | 1-(3-amino-5-sulfo-6-methylphenyl)-5-pyrazolone-3-carboxylic acid | greenish yellow |
| 15 | 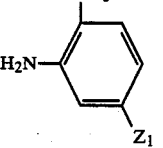 CH$_3$, H$_2$N—⌬—Z$_1$ | aminobenzene-2-sulfonic acid | 1-(3-amino-5-sulfo-6-methylphenyl)-5-pyrazolone-3-carboxylic acid | greenish yellow |
| 16 | 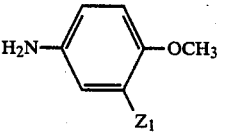 H$_2$N—⌬—OCH$_3$, Z$_1$ | aminobenzene-2-sulfonic acid | 1-(3-amino-5-sulfo-6-methylphenyl)-5-pyrazolone-3-carboxylic acid | greenish yellow |
| 17 | 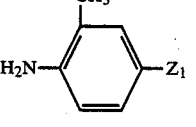 CH$_3$, H$_2$N—⌬—Z$_1$ | aminobenzene-2-sulfonic acid | 1-(3-amino-5-sulfo-6-methylphenyl)-5-pyrazolone-3-carboxylic acid | greenish yellow |
| 18 | 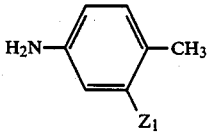 H$_2$N—⌬—CH$_3$, Z$_1$ | aminobenzene-2-sulfonic acid | 1-(3-amino-5-sulfo-6-methylphenyl)-5-pyrazolone-3-carboxylic acid | greenish yellow |

-continued

| Example | Amine of the general formula (8) | Amine of the general formula (3) | Coupling component of the general formula (9) | Hue |
|---|---|---|---|---|
| 19 | 4-amino-2-methoxy-5-methylphenyl-$Z_1$ (OCH$_3$ at 2, CH$_3$ at 5, $Z_1$ at 4) | aminobenzene-2-sulfonic acid | 1-(3-amino-5-sulfo-6-methylphenyl)-5-pyrazolone-3-carboxylic acid | greenish yellow |
| 20 | 2,5-dimethoxyphenyl-$Z_1$ (H$_2$N, OCH$_3$, $Z_1$, OCH$_3$) | aminobenzene-2-sulfonic acid | 1-(3-amino-5-sulfo-6-methylphenyl)-5-pyrazolone-3-carboxylic acid | greenish yellow |
| 21 | 2,5-dimethoxy substituted (H$_2$N, $Z_1$, OCH$_3$, H$_3$CO) | aminobenzene-2-sulfonic acid | 1-(3-amino-5-sulfo-6-methylphenyl)-5-pyrazolone-3-carboxylic acid | greenish yellow |
| 22 | 2-chloro-5-$Z_1$-aniline (H$_2$N, Cl, $Z_1$) | aminobenzene-2-sulfonic acid | 1-(3-amino-5-sulfo-6-methylphenyl)-5-pyrazolone-3-carboxylic acid | greenish yellow |
| 23 | H$_3$C, H$_2$N, $Z_1$, OCH$_3$ substituted benzene | aminobenzene-2-sulfonic acid | 1-(3-amino-5-sulfo-6-methylphenyl)-5-pyrazolone-3-carboxylic acid | greenish yellow |
| 24 | H$_2$N, Cl, H$_3$C, $Z_1$ substituted benzene | aminobenzene-2-sulfonic acid | 1-(3-amino-5-sulfo-6-methylphenyl)-5-pyrazolone-3-carboxylic acid | greenish yellow |
| 25 | H$_2$N—C$_6$H$_4$—$Z_1$ | 3-aminobenzenesulfonic acid | 1-(3-amino-5-sulfo-6-methylphenyl)-5-pyrazolone-3-carboxylic acid | yellow |
| 26 | H$_2$N—C$_6$H$_4$—$Z_1$ | 3-aminobenzenesulfonic acid | 1-(3-amino-5-sulfo-6-methylphenyl)-5-pyrazolone-3-carboxylic acid | yellow |
| 27 | H$_2$N—C$_6$H$_4$—$Z_1$ | 4-aminobenzenesulfonic acid | 1-(3-amino-5-sulfo-6-methylphenyl)-5-pyrazolone-3-carboxylic acid | yellow |
| 28 | H$_2$N—C$_6$H$_4$—$Z_1$ | aminobenzene-2,4-disulfonic acid | 1-(3-amino-5-sulfo-6-methylphenyl)-5-pyrazolone-3-carboxylic acid | greenish yellow |

-continued

| Example | Amine of the general formula (8) | Amine of the general formula (3) | Coupling component of the general formula (9) | Hue |
|---|---|---|---|---|
| 29 | H$_2$N—⟨benzene⟩—Z$_1$ | aminobenzene-2,5-disulfonic acid | 1-(3-amino-5-sulfo-6-methylphenyl)-5-pyrazolone-3-carboxylic acid | greenish yellow |
| 30 | H$_2$N—⟨benzene⟩—Z$_1$ | 4-aminotoluene-3-sulfonic acid | 1-(3-amino-5-sulfo-6-methylphenyl)-5-pyrazolone-3-carboxylic acid | greenish yellow |
| 31 | H$_2$N—⟨benzene⟩—Z$_1$ | 2-aminonaphthalene-1,5-disulfonic acid | 1-(3-amino-5-sulfo-6-methylphenyl)-5-pyrazolone-3-carboxylic acid | greenish yellow |
| 32 | H$_2$N—⟨benzene⟩—Z$_1$ | 2-aminonaphthalene-1-sulfonic acid | 1-(3-amino-5-sulfo-6-methylphenyl)-5-pyrazolone-3-carboxylic acid | greenish yellow |
| 33 | H$_2$N—⟨benzene⟩—Z$_1$ | aminobenzene-2-sulfonic acid | 1-(3-amino-5-sulfo-6-methylphenyl)-5-pyrazolone-3-carboxylic acid | greenish yellow |
| 34 | H$_2$N—⟨benzene⟩—Z$_1$ (meta) | aminobenzene-2-sulfonic acid | 1-(4-amino-3-sulfophenyl)-5-pyrazolone-3-carboxylic acid | greenish yellow |
| 35 | H$_2$N—⟨benzene⟩—Z$_1$ | aminobenzene-2,4-disulfonic acid | 1-(4-amino-3-sulfophenyl)-5-pyrazolone-3-carboxylic acid | greenish yellow |
| 36 | H$_2$N—⟨benzene⟩—Z$_1$ | aminobenzene-2,5-disulfonic acid | 1-(4-amino-3-sulfophenyl)-5-pyrazolone-3-carboxylic acid | greenish yellow |
| 37 | H$_3$CO—, H$_2$N—⟨benzene⟩—Z$_1$ | 2-aminonapthalene-6,8-disulfonic acid | 1-(4-amino-3-sulfophenyl)-5-pyrazolone-3-carboxylic acid | yellow |
| 38 | H$_2$N—⟨benzene⟩—Z$_1$ | aminobenzene-2-sulfonic acid | 1-(3-amino-6-sulfophenyl)-5-pyrazolone-3-carboxylic acid | greenish yellow |
| 39 | H$_2$N—⟨benzene⟩—Z$_1$ | aminobenzene-2-sulfonic acid | 1-(4-amino-3-sulfophenyl)-3-methyl-5-pyrazolone | yellow |
| 40 | H$_2$N—⟨benzene⟩—Z$_1$ | aminobenzene-2-sulfonic acid | 1-(3-amino-6-sulfophenyl)-3-methyl-5-pyrazolone | yellow |

-continued

| Example | Amine of the general formula (8) | Amine of the general formula (3) | Coupling component of the general formula (9) | Hue |
|---|---|---|---|---|
| 41 | H₂N–⌬–Z₁ | aminobenzene-2-sulfonic acid | 1-(4-amino-2-sulfo-phenyl)-3-methyl-5-pyrazolone | yellow |
| 42 | H₂N–⌬–Z₁ | aminobenzene-2-sulfonic acid | 1-(2-methyl-3-amino-5-sulfophenyl)-5-pyrazol-one-3-carboxylic acid | yellow |
| 43 | H₂N–⌬–Z₁ | aminobenzene-2-sulfonic acid | 1-(2-methyl-3-amino-5-sulfophenyl)-3-methyl-5-pyrazol | yellow |
| 44 | H₂N–⌬–Z₁ | aminobenzene-2-sulfonic acid | 1-(3-amino-5-sulfo-6-methylphenyl)-3-methyl-5-pyrazolone | yellow |
| 45 | H₂N–⌬–Z₁ | aminobenzene-2-sulfonic acid | 1-(4-amino-2,5-disulfo-phenyl)-5-pyrazolone-3-carboxylic acid | yellow |
| 46 | H₂N–⌬–Z₁ | H₂N–⌬–Z₁ | 1-(3-amino-5-sulfo-6-methylphenyl)-5-pyrazolone-3-carboxylic acid | yellow |
| 47 | H₂N–⌬–Z₁ | SO₃H / H₂N–⌬–Z₁ | 1-(3-amino-5-sulfo-6-methylphenyl)-5-pyrazol-one-3-carboxylic acid | greenish yellow |
| 48 | H₂N–⌬–Z₁ | H₂N–⌬ (Z₁ on meta) | 1-(3-amino-5-sulfo-6-methylphenyl)-5-pyrazol-one-3-carboxylic acid | yellow |
| 49 | H₂N–⌬–Z₁ | H₃CO / H₂N–⌬–Z₁ | 1-(3-amino-5-sulfo-6-methylphenyl)-5-pyrazol-one-3-carboxylic acid | yellow |
| 50 | H₂N–⌬–Z₁ | H₃CO / H₂N–⌬–Z₁ / CH₃ | 1-(3-amino-5-sulfo-6-methylphenyl)-5-pyrazol-one-3-carboxylic acid | yellow |
| 51 | H₂N–⌬–Z₁ | OCH₃ / H₂N–⌬–Z₁ / OCH₃ | 1-(3-amino-5-sulfo-6-methylphenyl)-5-pyrazol-one-3-carboxylic acid | yellow |

-continued

| Example | Amine of the general formula (8) | Amine of the general formula (3) | Coupling component of the general formula (9) | Hue |
|---|---|---|---|---|
| 52 | $H_2N$—⟨phenyl⟩—$Z_1$ | $H_2N$—⟨phenyl with $OCH_3$ and $Z_1$⟩ | 1-(3-amino-5-sulfo-6-methylphenyl)-5-pyrazolone-3-carboxylic acid | yellow |
| 53 | $H_2N$—⟨phenyl⟩—$Z_1$ | $HO_3S$—⟨phenyl⟩, $H_2N$—, $Z_1$ | 1-(4-amino-3-sulfophenyl)-5-pyrazolone-3-carboxylic acid | greenish yellow |
| 54 | $H_2N$—⟨phenyl⟩—$Z_1$ | $HO_3S$—⟨phenyl⟩, $H_2N$—, $Z_1$ | 1-(3-amino-6-sulfophenyl)-3-methyl-pyrazolone | greenish yellow |
| 55 | $H_2N$—⟨phenyl⟩—$Z_1$ | $HO_3S$—⟨phenyl⟩, $H_2N$—, $Z_1$ | 1-(4-amino-3-sulfophenyl)-3-methyl-5-pyrazolone | greenish yellow |
| 56 | $H_2N$—⟨phenyl⟩—$Z_1$ | $HO_3S$—⟨phenyl⟩, $H_2N$—, $Z_1$ | 1-(4-amino-2-sulfophenyl)-3-methyl-5-pyrazolone | greenish yellow |
| 57 | $H_2N$—⟨phenyl⟩—$Z_1$ | $HO_3S$—⟨phenyl⟩, $H_2N$—, $Z_1$ | 1-(3-amino-6-sulfophenyl)-5-pyrazolone-3-carboxylic acid | greenish yellow |
| 58 | $H_2N$—⟨phenyl⟩—$Z_1$ | $SO_3H$—⟨phenyl⟩, $H_2N$—, $Z_1$ | 1-(2-methyl-3-amino-5-sulfophenyl)-5-pyrazolone-3-carboxylic acid | greenish yellow |
| 59 | $H_2N$—⟨phenyl⟩—$Z_1$ | $SO_3H$—⟨phenyl⟩, $H_2N$—, $Z_1$ | 1-(2-methyl-3-amino-5-sulfophenyl)-3-methyl-5-pyrazolone | greenish yellow |
| 60 | $H_2N$—⟨phenyl⟩—$Z_1$ | $SO_3H$—⟨phenyl⟩, $H_2N$—, $Z_1$ | 1-(3-amino-5-sulfo-6-methylphenyl)-3-methyl-5-pyrazolone | greenish yellow |
| 61 | $H_2N$—⟨phenyl⟩—$Z_1$ | $SO_3H$—⟨phenyl⟩, $H_2N$—, $Z_1$ | 1-(4-amino-2,5-disulfophenyl)-5-pyrazolone-3-carboxylic acid | greenish yellow |
| 62 | $H_2N$—⟨phenyl⟩ with $Z_1$ | $H_2N$—⟨phenyl⟩—$Z_2$ | 1-(3-amino-5-sulfo-6-methylphenyl)-5-pyrazolone-3-carboxylic acid | yellow |

| Example | Amine of the general formula (8) | Amine of the general formula (3) | Coupling component of the general formula (9) | Hue |
|---|---|---|---|---|
| 63 | H$_2$N—⟨⟩—Z$_6$ | H$_2$N—⟨⟩—Z$_3$ | 1-(3-amino-5-sulfo-6-methyl-phenyl)-5-pyrazolone-3-carboxylic acid | yellow |
| 64 | H$_3$CO, H$_2$N—⟨⟩—Z$_1$ | H$_2$N—⟨⟩—Z$_4$ | 1-(3-amino-5-sulfo-6-methyl-phenyl)-5-pyrazolone-3-carboxylic acid | yellow |
| 65 | H$_2$N—⟨⟩—Z$_2$ | H$_2$N—⟨⟩—Z$_5$ | 1-(3-amino-5-sulfo-6-methyl-phenyl)-5-pyrazolone-3-carboxylic acid | yellow |
| 66 | H$_3$CO, H$_2$N—⟨⟩—Z$_1$, CH$_3$ | H$_2$N—⟨⟩—Z$_6$ | 1-(3-amino-5-sulfo-6-methyl-phenyl)-5-pyrazolone-3-carboxylic acid | yellow |
| 67 | H$_2$N—⟨⟩—Z$_6$ | COOH, H$_2$N—⟨⟩—Z$_1$ | 1-(3-amino-5-sulfo-6-methyl-phenyl)-5-pyrazolone-3-carboxylic acid | yellow |
| 68 | H$_2$N—⟨⟩—Z$_1$ | amino-2,5-dichloro-benzene-4-sulfonic acid | 1-(4-amino-3-sulfophenyl)-5-pyrazolone-3-carboxylic acid | yellow |
| 69 | H$_2$N—⟨⟩—Z$_1$ | 3-amino-5-sulfo-benzoic acid | 1-(2-methyl-3-amino-5-sulfo-phenyl)-3-methyl-5-pyrazolone | yellow |
| 70 | OCH$_3$, H$_2$N—⟨⟩—Z$_1$ | 4-aminoanisole-3-sulfonic acid | 1-(2-methyl-3-amino-5-sulfo-phenyl)-5-pyrazolone-3-carboxylic acid | yellow |
| 71 | OCH$_3$, H$_2$N—⟨⟩—Z$_4$ | 2-aminonaphtahlene-4,6,8-trisulfonic acid | 1-(2-methyl-3-amino-5-sulfo-phenyl)-5-pyrazolone-3-carboxylic acid | yellow |
| 72 | H$_2$N—⟨⟩—Z$_4$ | 2-aminonaphthalene-3,6,8-trisulfonic acid | 1-(4-amino-6-sulfophenyl)-5-pyrazolone-3-carboxylic acid | yellow |

-continued

| Example | Amine of the general formula (8) | Amine of the general formula (3) | Coupling component of the general formula (9) | Hue |
|---|---|---|---|---|
| 73 | $H_2N$—⟨phenyl⟩—$Z_1$ | 2-aminonaphthalene-3,6,8-trisulfonic acid | 1-(3-amino-5-sulfo-6-methyl-phenyl)-5-pyrazolone-3-carboxylic acid | yellow |
| 74 | $H_2N$—⟨phenyl⟩—$Z_1$ | 2-aminonaphthalene-4,6,8-trisulfonic acid | 1-(3-amino-5-sulfo-6-methyl-phenyl)-5-pyrazolone-3-carboxylic acid | yellow |
| 75 | $H_2N$—⟨phenyl⟩—$Z_4$ | 2-aminonaphthalene-4,6,8-trisulfonic acid | 1-(3-amino-5-sulfo-6-methyl-phenyl)-5-pyrazolone-3-carboxylic acid | yellow |
| 76 | $H_2N$—⟨phenyl⟩—$Z_3$ | 2-aminonaphthalene-4,6,8-trisulfonic acid | 1-(3-amino-5-sulfo-6-methyl-phenyl)-5-pyrazolone-3-carboxylic acid | yellow |
| 77 | $H_2N$—⟨phenyl⟩—$Z_5$ | 2-aminonaphthalene-4,6,8-trisulfonic acid | 1-(3-amino-5-sulfo-6-methyl-phenyl)-5-pyrazolone-3-carboxylic acid | yellow |
| 78 | $H_2N$—⟨phenyl⟩—$Z_4$ | 1-aminonaphthalene-2,4,7-trisulfonic acid | 1-(3-amino-5-sulfo-6-methyl-phenyl)-5-pyrazolone-3-carboxylic acid | yellow |
| 79 | $H_2N$—⟨phenyl⟩—$Z_1$ | 1-aminonaphthalene-2,4,7-trisulfonic acid | 1-(3-amino-5-sulfo-6-methyl-phenyl)-5-pyrazolone-3-carboxylic acid | yellow |
| 80 | $H_2N$—⟨phenyl⟩—$Z_1$ | 2-aminonaphthalene-1,5,7-trisulfonic acid | 1-(3-amino-5-sulfo-6-methyl-phenyl)-5-pyrazolone-3-carboxylic acid | yellow |
| 81 | $H_2N$—⟨phenyl⟩—$Z_4$ | 2-aminonaphthalene-1,5,7-trisulfonic acid | 1-(3-amino-5-sulfo-6-methyl-phenyl)-5-pyrazolone-3-carboxylic acid | yellow |
| 82 | $H_2N$—⟨phenyl⟩—$Z_2$ | aminobenzene-2-sulfonic acid | 1-(3-amino-5-sulfo-6-methyl-phenyl)-5-pyrazolone-3-carboxylic acid | greenish yellow |
| 83 | $H_2N$—⟨phenyl⟩—$Z_3$ | aminobenzene-2-sulfonic acid | 1-(3-amino-5-sulfo-6-methyl-phenyl)-5-pyrazolone-3-carboxylic acid | greenish yellow |
| 84 | $H_2N$—⟨phenyl⟩—$Z_4$ | aminobenzene-2-sulfonic acid | 1-(3-amino-5-sulfo-6-methyl-phenyl)-5-pyrazolone-3-carboxylic acid | greenish yellow |
| 85 | $H_2N$—⟨phenyl(meta)⟩—$Z_4$ | aminobenzene-2-sulfonic acid | 1-(3-amino-5-sulfo-6-methyl-phenyl)-5-pyrazolone-3-carboxylic acid | greenish yellow |

APPLICATION EXAMPLE 1

20 parts of the compound according to the invention (in the form of the sodium salt) of Example 1 or 3 are dissolved in 300 parts of water together with 50 parts of urea. The solution is stirred at below 40° C. into 400 parts of a neutral, aqueous 4% strength alginate thickener. 10 parts of sodium carbonate are added, and the batch is made up to a total of 1,000 parts by means of 4% strength aqueous alginate thickener. The mixture is thoroughly stirred, and the resulting print paste is used to print a cotton fabric which, after drying at 60° C., is treated in a commercially available steamer unit for 5 minutes with saturated steam of 100° to 103° C. The print thus prepared is then finished by rinsing with cold and hot water, by washing with a neutral detergent, and by another rinse with water. After the goods have dried, a deep greenish yellow print is obtained which has very good light fastness and very good wet fastness properties.

APPLICATION EXAMPLE 2

A mercerized cotton fabric is padded with an aqueous dyeing liquor of 20° C. at a liquor pick-up of 80%, relative to the weight of the goods, the dyeing liquor containing, per liter, 20 g of the sodium salt of the azo compound according to the invention of Example 1 or 3 and 18 g of 33% strength sodium hydroxide solution. The padded fabric is wound onto a roller, wrapped in plastic sheeting, and left for eight hours at room temperature. The dyeing is then finished by rinsing with cold water, by treating with an aqueous bath containing a small amount of acetic acid and by another rinse in cold and hot water. After drying, a deep greenish yellow dyeing of very good light fastness and of very good wet fastness properties is obtained.

APPLICATION EXAMPLE 3

100 parts of a mercerized cotton fabric are treated for 10 minutes at 60° C. in 3,000 parts by volume of an aqueous dye bath which contains 5 parts of the sodium salt of the compound according to the invention of Example 1 and 150 parts of anhydrous sodium salt. After this treatment for 10 minutes, 15 parts of anhydrous sodium carbonate and 4 parts of 33% strength sodium hydroxide solution are added. The dyeing is continued for 60 minutes at 60° C. The dyed fabric is then finished in a customary manner, such as, for example, in the manner of Application Example 2. A deep, greenish yellow dyeing is obtained which has very good light fastness and very good wet fastness properties.

APPLICATION EXAMPLE 4

100 parts of a wool fabric are introduced into a warm aqueous dye bath at 40° C. which is comprised of 3,000 parts of water, 2 parts of the sodium salt of the compound according to the invention described in Example 1, 0.15 part of an addition product of 12 moles of ethylene oxide to 1 mole of stearylamine, 2 parts of ammonium acetate and 2 parts of 60% strength aqueous acetic acid. The dyeing temperature is raised in the course of 30 minutes to the boil, and the dyeing is then continued for 60 minutes at 100° C. After the wool dyeing obtained has been washed out and finished as customary, this wool fabric displays a deep, greenish yellow shade of very good light fastness and very good wet fastness properties.

APPLICATION EXAMPLE 5

The dyeing method given in Application Example 4 is followed, but the wool fabric is replaced by 100 parts of a fabric made of an ε-polycaprolactam fiber. A deep, greenish yellow dyeing of good end-use fastness properties is likewise obtained.

The other monoazo compounds according to the invention described here in the illustrative embodiments and tabled examples can also be used in the dyeing and printing methods in accordance with the above application examples. Very deep dyeings and prints of good light and wet fastness properties in the hues indicated for a particular illustrative embodiment or tabled example are also obtained in an analogous manner, for example by using the dyeing and printing methods described in Application Examples 1 to 5, with another dyestuff of the present invention.

We claim:

1. A water-soluble monoazo compound of the formula

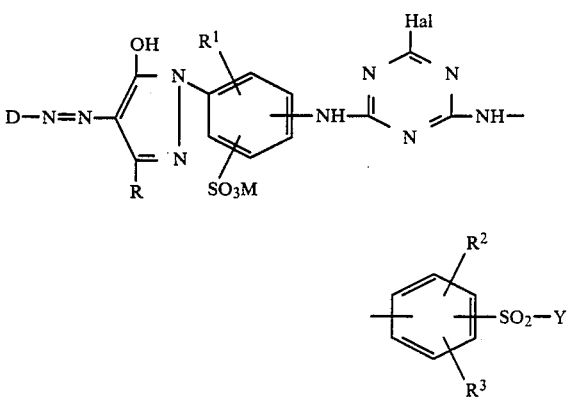

in which
D is phenyl or naphthyl and both are substituted by 1, 2 or 3 substituents selected from the set consisting of three sulfo, two carboxy, two alkyl of 1 to 4 C-atoms, two alkoxy of 1 to 4 C-atoms, one bromine, two chlorine and two groups of the formula —SO$_2$—Z in which Z is β-hydroxyethyl or a group Y of the meaning indicated below,
R is carboxy,
R$^1$, R$^2$ and R$^3$ are identical to or different from one another and
R$^1$ is hydrogen or alkyl of 1 to 4 C-atoms,
R$^2$ is hydrogen, alkyl of 1 to 4 C-atoms, alkoxy of 1 to 4 C-atoms or chlorine,
R$^3$ is hydrogen, alkyl of 1 to 4 C-atoms or alkoxy of 1 to 4 C-atoms,
Y is vinyl or ethyl substituted in the β-position by a substituent which is eliminated as an anion under alkaline conditions, and
Hal is chlorine.

2. A compound according to claim 1, wherein D is monosulfophenyl, disulfophenyl, monosulfonaphthyl, disulfonaphthyl or trisulfonaphthyl.

3. A compound according to claim 1, wherein one sulfo is bonded to D in ortho-position relative to the azo group.

4. A compound according to claim 1, wherein D is phenyl substituted by 1, 2 or 3 substituents selected from the group consisting of one sulfo, one group of the formula —SO₂—Y in which Y is β-sulfatoethyl, β-phosphatoethyl or β-thiosulfatoethyl, one carboxy, two chlorine, one bromine, two alkyl of 1 to 4 C-atoms and two alkoxy of 1 to 4 C-atoms.

5. A compound according to in claim 1, of the formula

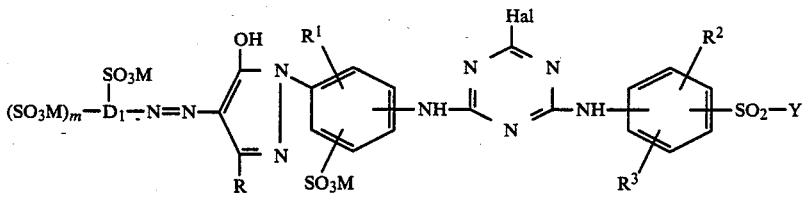

in which M, Y, R, R¹, R², R³ and Hal are defined as in claim 1, D₁ is a benzene or naphthalene ring in which a sulfo group is bonded in the ortho-position relative to the azo group, and m is 1 or 2, or the group (SO₃H)ₘ is hydrogen.

6. A compound according to claim 5 in which D₁ is the benzene nucleus and the group (SO₃H)ₘ is hydrogen.

7. A compound according to claim 1, wherein Y is vinyl or β-sulfatoethyl.

8. A compound according to claim 1, wherein Y is β-sulfatoethyl.

9. A compound according to claim 5, wherein Y is vinyl or β-sulfatoethyl.

10. A compound according to claim 5, wherein Y is β-sulfatoethyl.

11. A compound according to claim 1, wherein M is hydrogen, sodium or potassium.

12. A compound according to claim 5, wherein M is hydrogen, sodium or potassium.

13. A water-soluble monoazo compound of the formula

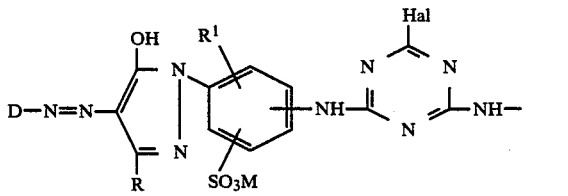

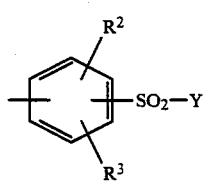

in which

D is phenyl substituted by 1, 2 or 3 substituents selected from the group consisting of two sulfo, one carboxy, two chlorine, one bromine, two alkyl of 1 to 4 C-atoms and two alkoxy of 1 to 4 C-atoms, R is carboxy, R¹, R² and R³ are identical to or different from one another and R¹ is hydrogen or alkyl of 1 to 4 C-atoms, R² is hydrogen, alkyl of 1 to 4 C-atoms, alkoxy of 1 to 4 C-atoms or chlorine, R³ is hydrogen, alkyl of 1 to 4 C-atoms or alkoxy of 1 to 4 C-atoms, Y is vinyl or ethyl substituted in the β-position by a substituent which is eliminated as an anion under alkaline conditions, and Hal is chlorine.

14. A compound according to claim 13, wherein D is monosulfophenyl or disulfophenyl.

15. A compound according to claim 13, wherein one sulfo is bonded to D in ortho-position relative to the azo group.

16. A compound of the formula

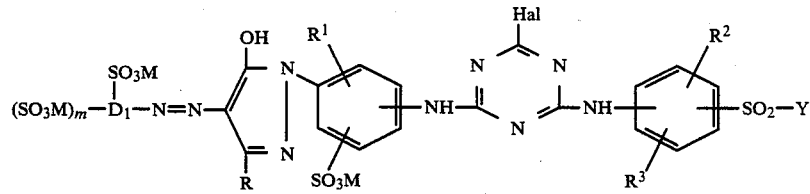

in which M, Y, R, R¹, R², R³ and Hal are defined as in claim 13, D₁ is a benzene ring in which a sulfo group is bonded in the ortho-position relative to the azo group, and m is 1 or 2, or the group (SO₃H)ₘ is hydrogen.

17. A compound according to claim 16, in which m is 1.

18. A compound according to claim 16, in which the group (SO₃H)ₘ is hydrogen.

19. A compound according to claim 13, wherein Y is vinyl or β-sulfatoethyl.

20. A compound according to claim 13, wherein Y is β-sulfatoethyl.

21. A compound according to claim 13, wherein M is hydrogen, sodium or potassium.

22. A water-soluble monoazo compound of the formula

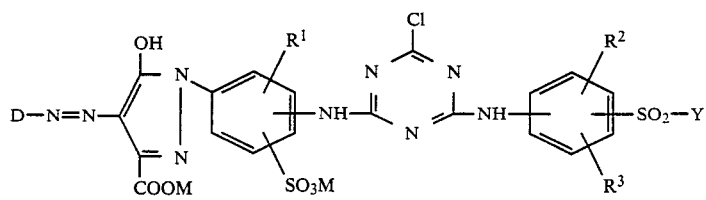

in which
- D is phenyl substituted by sulfo or by one β-sulfatoethylsulfonyl, or is naphthyl substituted by sulfo,
- $R^1$ is hydrogen or alkyl of from 1 to 4 carbon atoms,
- $R^2$ is hydrogen, alkyl of from 1 to 4 carbon atoms, alkoxy of from 1 to 4 carbon atoms or chlorine,
- $R^3$ is hydrogen, alkyl of from 1 to 4 carbon atoms or alkoxy of from 1 to 4 carbon atoms,
- Y is β-sulfatoethyl or vinyl and
- M is hydrogen or an alkali metal.

23. A compound according to claim 22, wherein Y is vinyl or β-sulfatoethyl.

* * * * *